United States Patent
Takahashi

(10) Patent No.: US 9,710,209 B2
(45) Date of Patent: Jul. 18, 2017

(54) PRINTING APPARATUS WHICH IS CAPABLE OF CONTROLLING A WAY OF STOPPING A PRINT JOB ACCORDING TO A PRINT METHOD

(71) Applicant: CANON KABUSHIKI KAISHA, Tokyo (JP)

(72) Inventor: Toru Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/675,731

(22) Filed: Mar. 31, 2015

(65) Prior Publication Data
US 2015/0294201 A1    Oct. 15, 2015

(30) Foreign Application Priority Data
Apr. 15, 2014   (JP) ................. 2014-083999

(51) Int. Cl.
G06F 3/12     (2006.01)
H04N 1/00     (2006.01)
G03G 15/00    (2006.01)

(52) U.S. Cl.
CPC ....... *G06F 3/1258* (2013.01); *G03G 15/5012* (2013.01); *G06F 3/1208* (2013.01); *G06F 3/1285* (2013.01); *H04N 1/00915* (2013.01)

(58) Field of Classification Search
None
See application file for complete search history.

(56) References Cited

U.S. PATENT DOCUMENTS

| | | | |
|---|---|---|---|
| 8,493,603 B2 | 7/2013 | Kanai | |
| 2002/0101604 A1* | 8/2002 | Mima | G06F 3/121 358/1.15 |
| 2007/0109586 A1* | 5/2007 | Yamada | G06F 3/121 358/1.14 |
| 2011/0261385 A1* | 10/2011 | Kanai | G06F 3/1204 358/1.13 |

FOREIGN PATENT DOCUMENTS

JP    2007-102496 A    4/2007

\* cited by examiner

*Primary Examiner* — Nicholas Pachol
*Assistant Examiner* — Pawandeep Dhingra
(74) *Attorney, Agent, or Firm* — Fitzpatrick, Cella, Harper & Scinto

(57) ABSTRACT

When a printing apparatus of the present invention receives an instruction for stopping printing in a case where printing of a number of copies is performed based on print data for a plurality of pages, if printing is performed by a first print method that performs, for each copy, processing of consecutively printing the plurality of pages and there is a page for which print processing is not started out of pages included in a copy for which print processing is started, the printing apparatus stops the printing after continuing printing until that page, and if printing is performed by a second print method that performs, for each page, processing of repeatedly printing the same page for the number of copies, the printing apparatus stops printing without starting printing processing of a new sheet.

11 Claims, 11 Drawing Sheets

F I G. 2
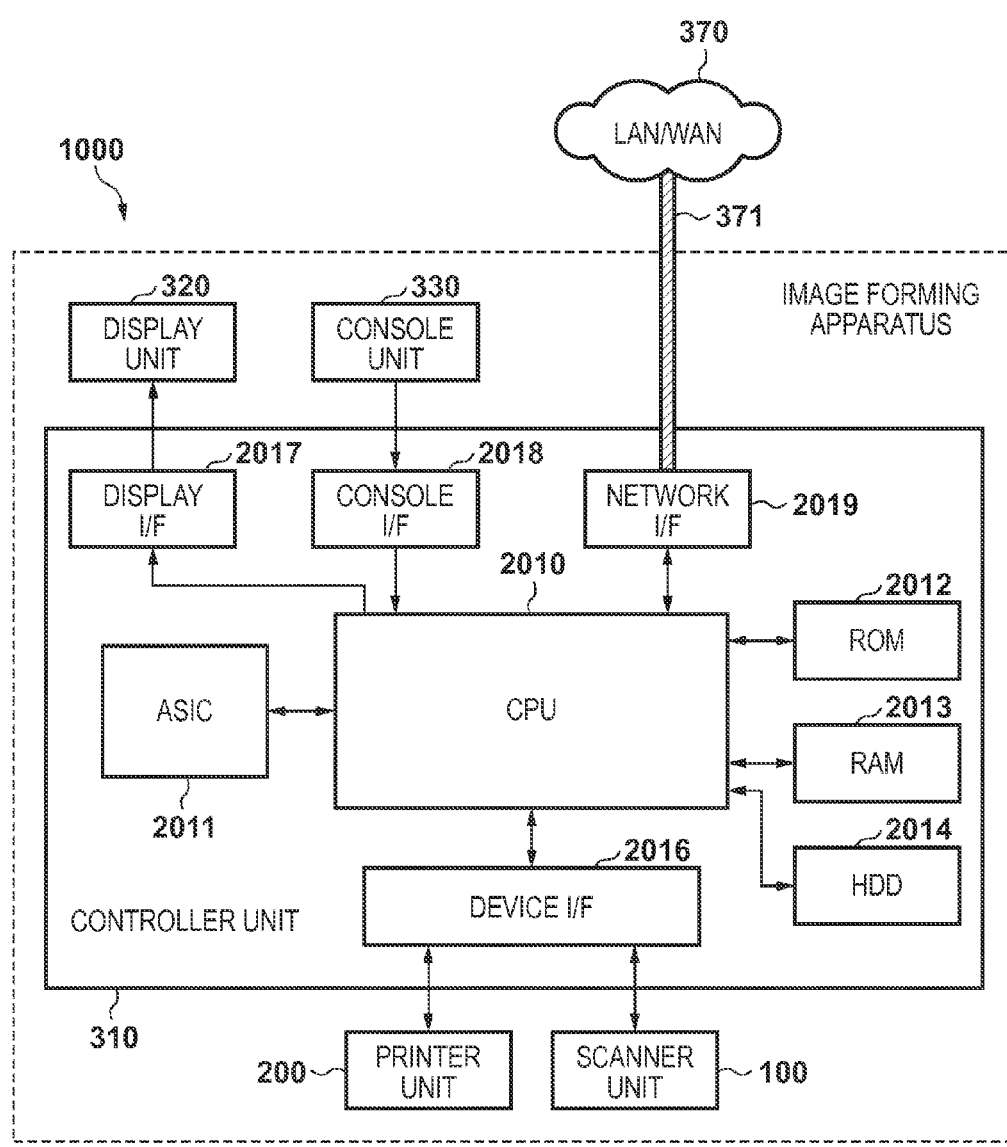

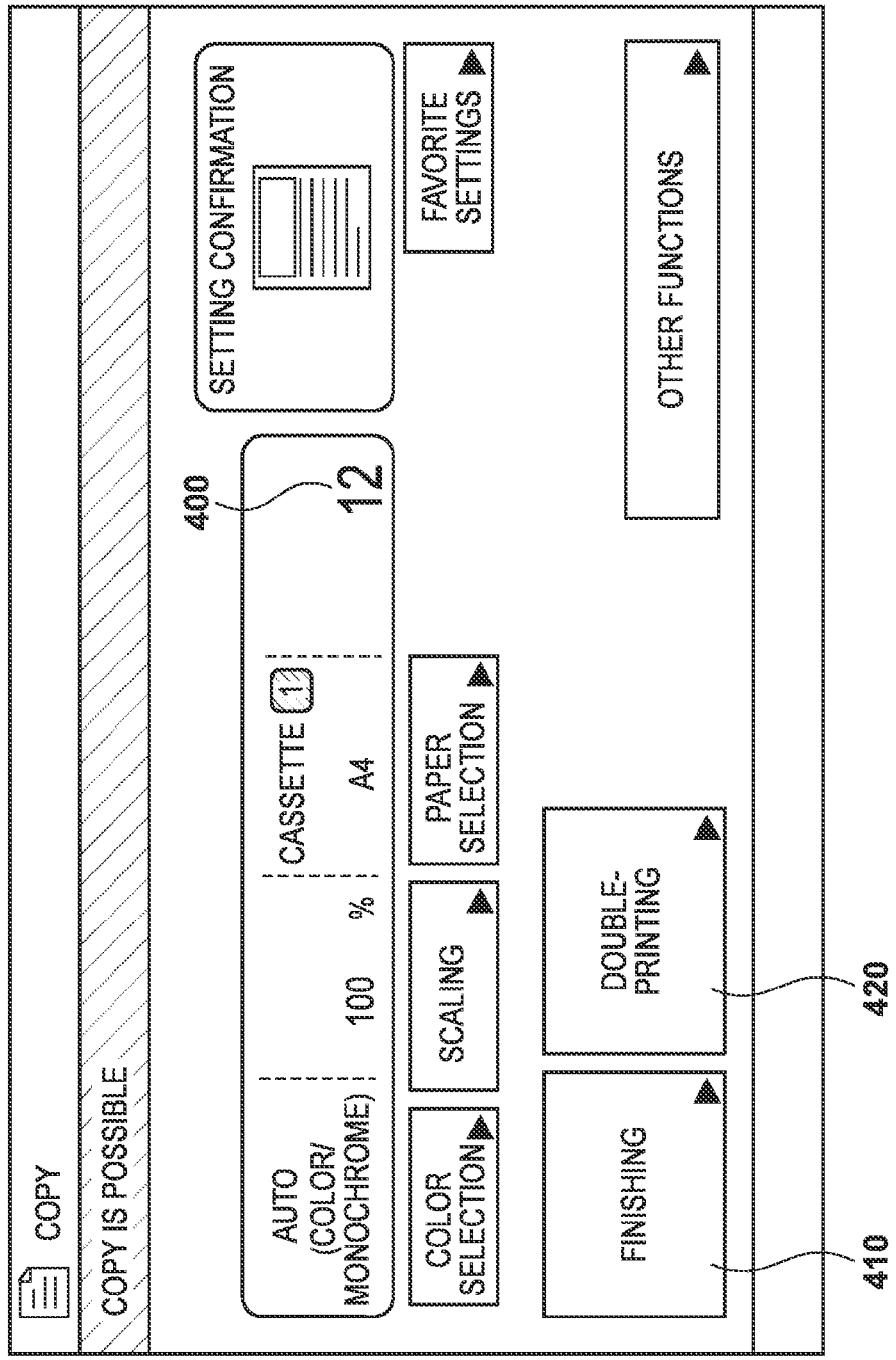

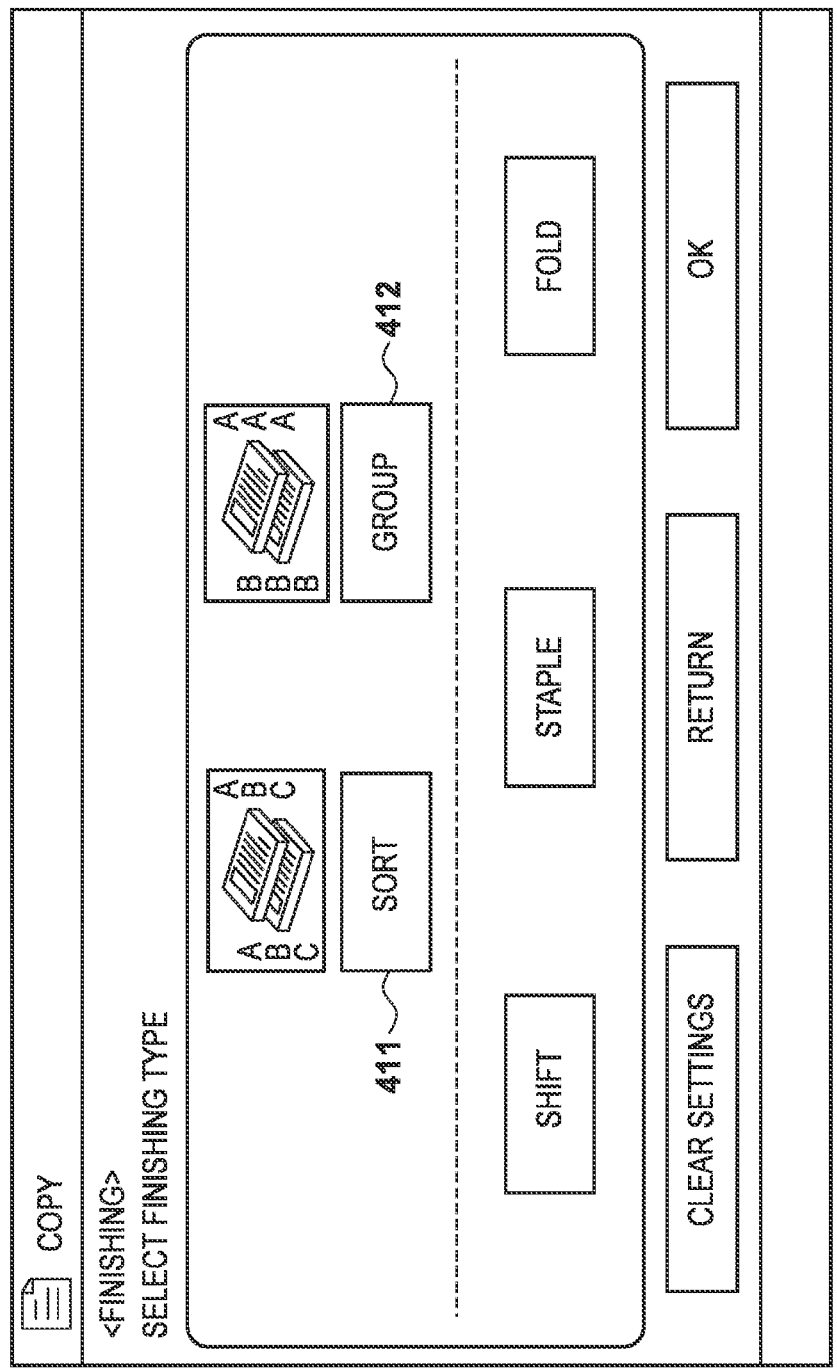

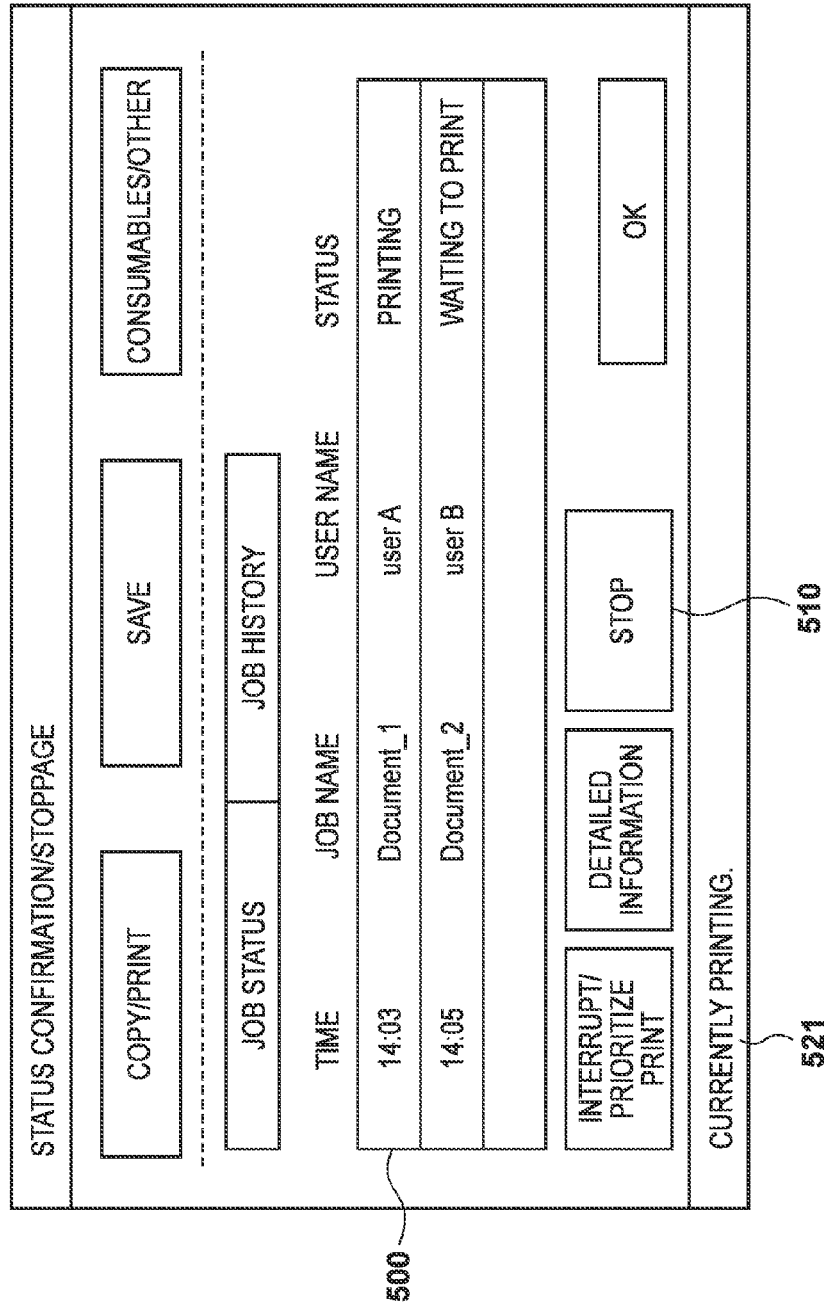

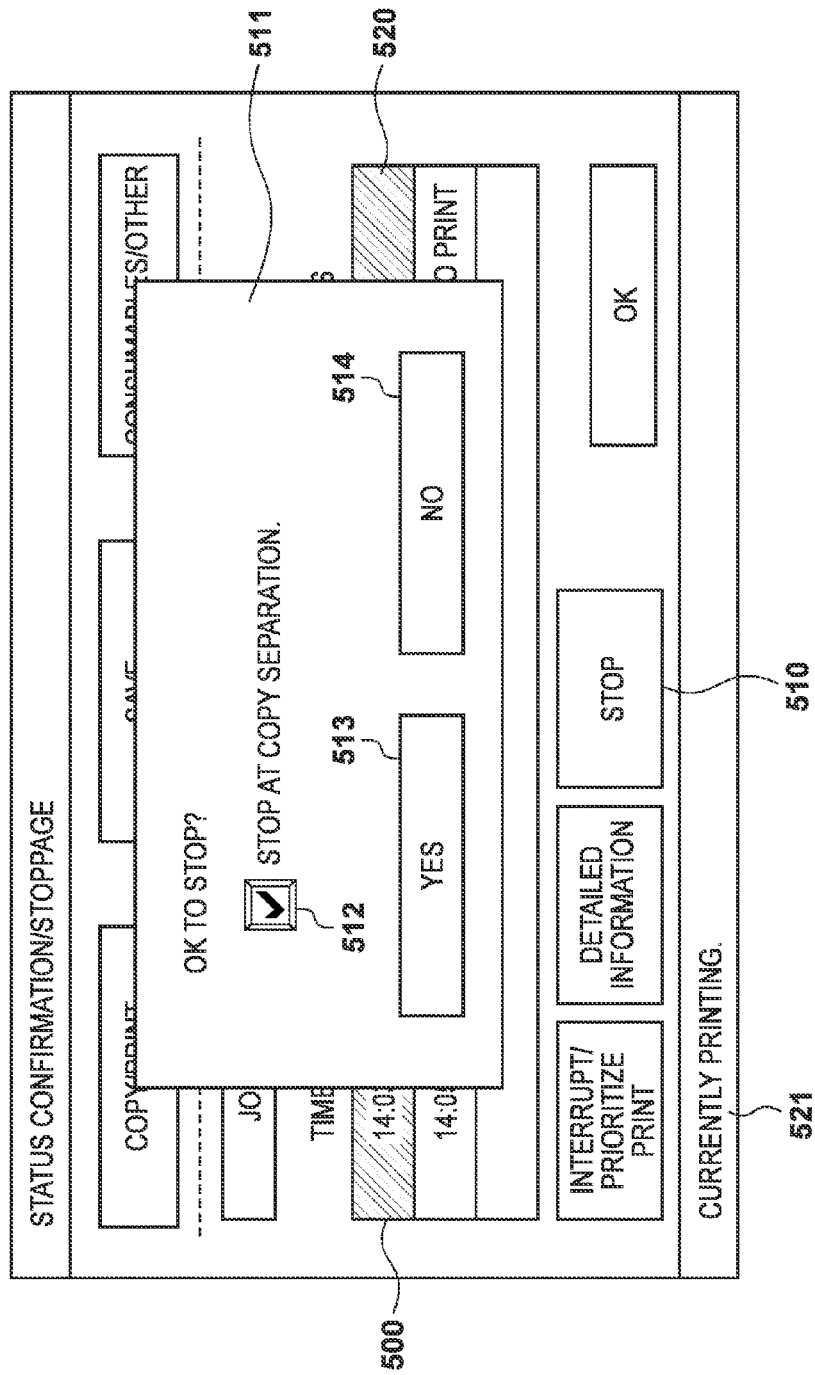

PRINTING APPARATUS WHICH IS CAPABLE OF CONTROLLING A WAY OF STOPPING A PRINT JOB ACCORDING TO A PRINT METHOD

BACKGROUND OF THE INVENTION

Field of the Invention

The present invention relates to a printing apparatus, a method of controlling the same, and a computer-readable storage medium.

Description of the Related Art

Generally, if a stop instruction to stop a print in process is performed in an image forming apparatus such as a printer or digital multifunction peripheral equipment (for example, a stop key is pressed by a user), printing processing that is being performed is stopped at a timing that is as early as possible. For this reason, if stopping processing is performed on a printing job that will execute post-processing, such as in stapling, for example, for a sheet bundle that is printed in units of copies, since printing will be stopped in the middle of printing of the copies, an incomplete sheet bundle will be generated. In Japanese Patent Laid-Open No. 2007-102496, stopping print processing at a timing of a separation of copies has been proposed, if a stop instruction is performed while a print job is in progress as described above. Furthermore, as a method of stopping a print job for performing printing of a plurality of copies, an instant stop to cause print processing to stop at a timing that is as early as possible, and a stop between copies to cause print processing to stop at a timing that is at a separation of copies is selectable.

However, in Japanese Patent Laid-Open No. 2007-102496, issuing an instruction to stop between copies for a print job of a mode wherein a number of copies, for which identical pages are specified, are repeatedly printed, and this print processing is executed sequentially for each page (group printing) is not considered. In other words, even if an instruction is made to stop between copies for a print job for which group printing has been specified, since there is no timing at which a separation of copies exists, as a result print processing is not stopped, and printing is performed to the end.

SUMMARY OF THE INVENTION

An aspect of the present invention is to eliminate the above-mentioned problems which are found in the conventional technology.

A feature of the present invention is to provide a technique of appropriately making it possible to stop a print job in which, for each page, print processing that repeatedly prints the same page for the number of copies specified is executed sequentially.

According to a first aspect of the present invention, there is provided a printing apparatus, comprising: a printing unit configured to print an image on a sheet; a selection unit configured to select, as a print method for a case in which printing is performed for a number of copies based on print data for a plurality of pages, a first print method that performs, for each copy, processing of consecutively printing pages corresponding to the plurality of pages, or a second print method that performs, for each page, processing of repeatedly printing the same page for the number of copies; a receiving unit configured to receive an instruction for stopping printing; and a control unit configured to control, in a case where the receiving unit receives the instruction for stopping printing, (i) to stop printing after executing printing until a final page included in a copy for which print processing is started if the printing is performed by the first print method, and (ii) to stop printing without starting printing processing of a new sheet if the printing is performed by the second print method.

According to a second aspect of the present invention, there is provided a printing apparatus, comprising: a printing unit configured to print an image on a sheet; a selection unit configured to select, as a print method for a case in which printing is performed for a number of copies based on print data for a plurality of pages, a first print method that performs, for each copy, processing of consecutively printing pages corresponding to the plurality of pages, or a second print method that performs, for each page, processing of repeatedly printing the same page for the number of copies; a receiving unit configured to receive an instruction for stopping printing; and a control unit configured to, when the receiving unit receives the instruction for stopping printing, control, if printing is performed by the first print method, so as to receive an instruction as to whether or not to stop printing at a separation of copies, and control, if printing is performed by the second print method, so as to not receive the instruction as to whether or not to stop printing at a separation of copies.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 depicts a schematic view for explaining a hardware configuration of the image forming apparatus according to the first embodiment.

FIG. 4A and FIG. 4B depict views for illustrating examples of an operation screen that is displayed to a display unit in the image forming apparatus according to the first embodiment.

FIG. 5A and FIG. 5B depict views for illustrating examples of screens for displaying an execution status of a job that is being performed, in an image forming apparatus according to the first embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
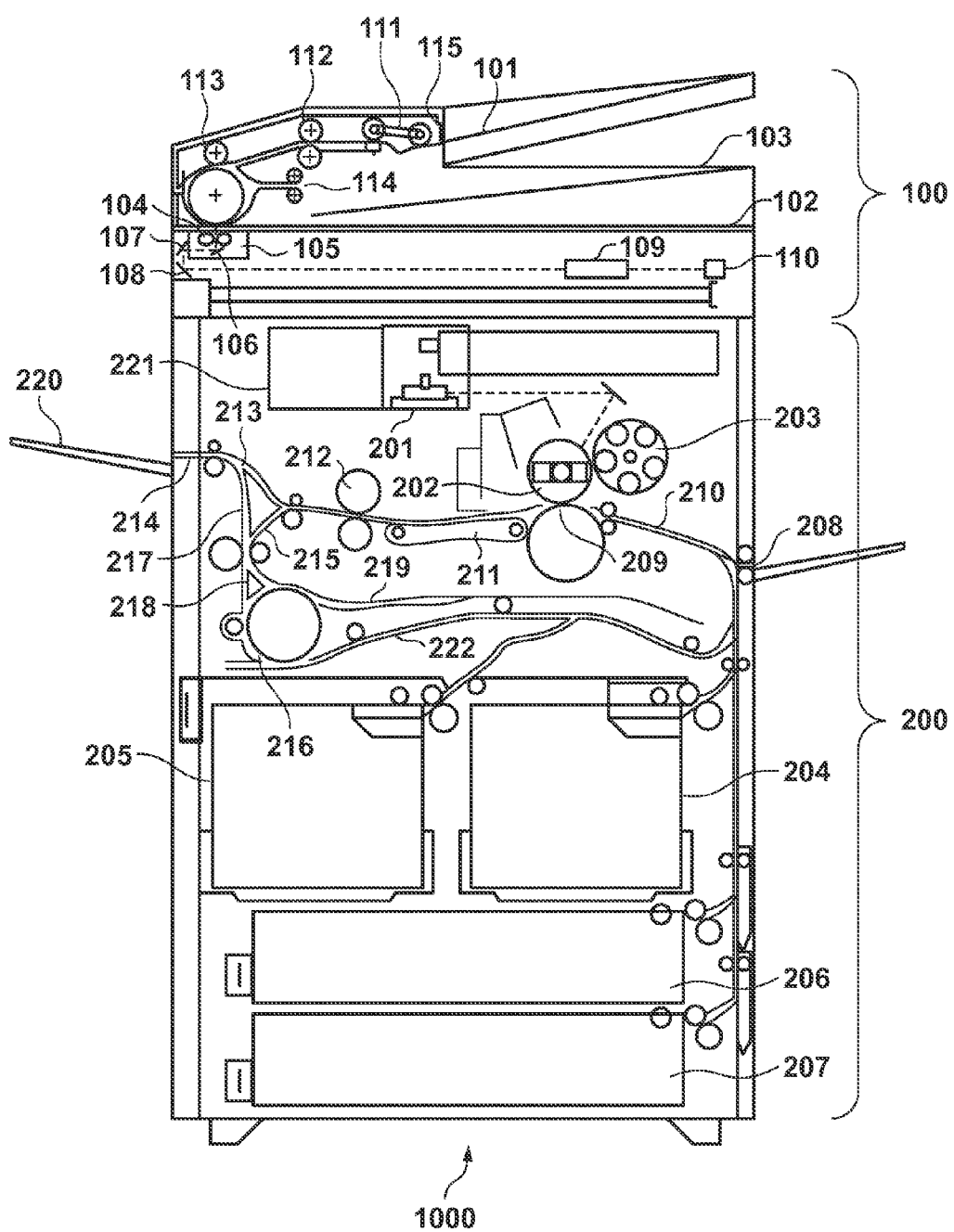
FIG. 1 depicts a cross-sectional view for explaining a configuration of a scanner unit and a printer unit of an image forming apparatus according to a first embodiment of the present invention.

FIG. 1 depicts a cross-sectional view for explaining a configuration of a printer unit 200 and scanner unit 100 of an image forming apparatus 1000 according to a first embodiment of the present invention. Note that the image forming apparatus 1000 according to the first embodiment is explained using an example of a multifunction processing apparatus (MFP: multi function peripheral) that comprises a scanning function, a print function, a send function and a box function.

In the case of reading an original document that is stacked in an original tray 101 of the scanner unit 100, an optical unit 105 is fixed to a predetermined position and a lamp 104 is turned on. In this state, original documents are read by feeding the original documents one sheet at a time from the original tray 101, causing the original documents to move relatively to the optical unit 105, exposing the original documents by the optical unit 105 (flow reading). At this time, if it is detected that an original document is stacked in the original tray 101 by a sensor 115, a pick-up roller 111 is caused to rotate and the original document on the original tray 101 is pulled inside. Afterwards, the original document passes through the optical unit 105 via a first conveyance roller 112 and a second conveyance roller 113, and is discharged to a discharge tray 103. Also, in the case of reading both sides of an original document, an original document that passes through the optical unit 105 is caused to switch back by a reversing roller 114, thereby causing the front/back of the original document to be reversed. After this, once again, by causing the original document that was caused to be reversed to pass through the optical unit 105 via the second conveyance roller 113, exposure scanning is performed on a back-side of the original document, and furthermore the original is caused to switch back one more time by the reversing roller 114 and is discharged to the discharge tray 103.

In contrast to this, in the case of reading an original document that is set on a platen glass 102, the lamp 104 is lit, and the optical unit 105 is caused to move in a sub-scanning direction (a rightward direction in FIG. 1) to perform exposure scanning on the original document.

The light reflected from the original document on which exposure scanning was performed is guided into a CCD (Charge Coupled Device) image sensor 110 by mirrors 106, 107 and 108 and a lens 109. In this way, an image of a scanned original document is output as an image signal by the CCD image sensor 110. After this image signal is converted into image data to which predetermined processing is applied, it is sent to a controller unit 310 (FIG. 2).

Next an explanation will be given for a configuration of the printer unit 200.

A laser driver 221 of the printer unit 200 drives a laser emitting unit 201, and causes a laser beam to be emitted by the laser emitting unit 201 in accordance with image data output by the controller unit 310. By having this laser beam irradiate a photosensitive drum 202, a latent image is formed on a surface of the photosensitive drum 202 according to the laser beam. Then, a developer (toner) is adhered to a portion of the latent image formed on the photosensitive drum 202 by a developing unit 203.

The printer unit 200 is provided with each of cassettes 204, 205, 206 and 207 in a pulled out state, and a manual feed tray 208 that is exposed on the outside of the device, as a storage unit for print paper. It is possible to supply print paper to the cassettes excluding the manual feed tray 208 by pulling out the cassette, supplying the print paper, and closing the cassette.

Then, by feeding print paper from one of the cassettes 204-207 and the manual feed tray 208 at a timing that is synchronized with a start of irradiation of a laser beam, the print paper is conveyed to a transfer unit 209 through a conveyance path 210, and a developer that was adhered to the photosensitive drum 202 is transferred. In this way, a print paper that has developer on it is conveyed to a fixing unit 212 by a conveyance belt 211, and the developer is fixed to the print paper by pressure and heat from the fixing unit 212. After this, the print paper that passed through the fixing unit 212 passes through a conveyance path 213 and a conveyance path 214, and is discharged to a discharge bin 220. Alternatively, in the case that a printing surface is inverted and discharged, it is guided to a conveyance path 215 and a conveyance path 219, and then the print paper is conveyed in an opposite direction, the print paper passes through a conveyance path 217 and the conveyance path 214, and then is discharged to the discharge bin 220.

Also, in the case that a double-sided printing is set, after a print paper passes the fixing unit 212, it is guided to the conveyance path 219 from the conveyance path 215 by a flapper 218, and afterwards, the printing sheet is conveyed in an opposite direction, and guided to a conveyance path 216 and a conveyance path for re-feeding 222 by the flapper 218. A print paper that was guided to the conveyance path for re-feeding 222 is fed to the transfer unit 209 after passing through the conveyance path 210 at the above described timing, and an image is printed on a back-side of the printed sheet.

FIG. 2 depicts a schematic view for explaining a hardware configuration of the image forming apparatus 1000 according to a first embodiment of the present invention.

The image forming apparatus 1000 comprises a controller unit (control unit) 310, a display unit 320, a console unit 330, the printer unit 200, and the scanner unit 100. The display unit 320 comprises an LED and a liquid crystal display unit and is used to display an internal state of the apparatus and details of operations by an operator. The console unit 330 receives operations by an operator. There are also cases in which the console unit 330 is realized as a touch display together with the display unit 320 in addition to comprising a plurality of operation buttons. The printer unit 200 prints image data to paper media. The scanner unit 100 reads an image of an original document and outputs it as image data.

The controller unit 310 includes a CPU 2010, an ASIC (Application Specific Integrated Circuit) 2011, a ROM 2012 and a RAM 2013. Furthermore, it includes an HDD (hard disk drive) 2014, a device I/F (interface) 2016, a display I/F 2017, a console I/F 2018 and a network I/F 2019.

The CPU 2010 controls overall operation of the image forming apparatus 1000 according to a control program deployed into the RAM 2013, and controls operation of devices connected to the controller unit 310 through I/Fs, non-transitory computer-readable storage medium memory, dedicated chips, or the like. The ASIC 2011 is an IC chip for a specific purpose, and is responsible for specific processing such as image processing that is separate from the CPU 2010. Control programs are stored in the ROM 2012 or the HDD 2014, and when a control program is executed, the control program is deployed into the RAM 2013, and executed under the control of the CPU 2010. Also, the RAM 2013 is used as a work memory in a case when a control program is executed by the CPU 2010, and the RAM 2013 is used to store print jobs and image data to be printed. Also, print jobs and image data to be printed, or the like, are stored in the HDD 2014. Note that, only one of each of the CPU 2010, the ASIC 2011, the ROM 2012, the RAM 2013 and the HDD 2014 exist in FIG. 2, but there are other embodiments wherein a configuration is taken in which there is a plurality of each of these, and therefore there need not be limitation to only these elements or to the connection configuration of this embodiment.

The device I/F 2016 controls input/output of data between the controller unit 310 and devices (the printer unit 200, the scanner unit 100) connected to the controller unit 310, and performs device control instructions, device state notification communication, and the like. There are not only cases in which the device I/F 2016 is realized as a bus structure that can be connected to a plurality of devices; there are also cases in which it is divided into a plurality of I/F and comprises one-to-one I/Fs for connectable devices. The display I/F 2017 is responsible for output to the display unit 320. The console I/F 2018 is responsible for input from the console unit 330.

The image forming apparatus 1000 comprises, as an external I/F, the network I/F 2019, which is responsible for input/output of data with a network. The image forming apparatus 1000 is connected to the Internet or an intranet which is a LAN/WAN (Local Area Network/Wide Area Network) 370 via the network I/F 2019 using a network cable 371.

Figure 3:
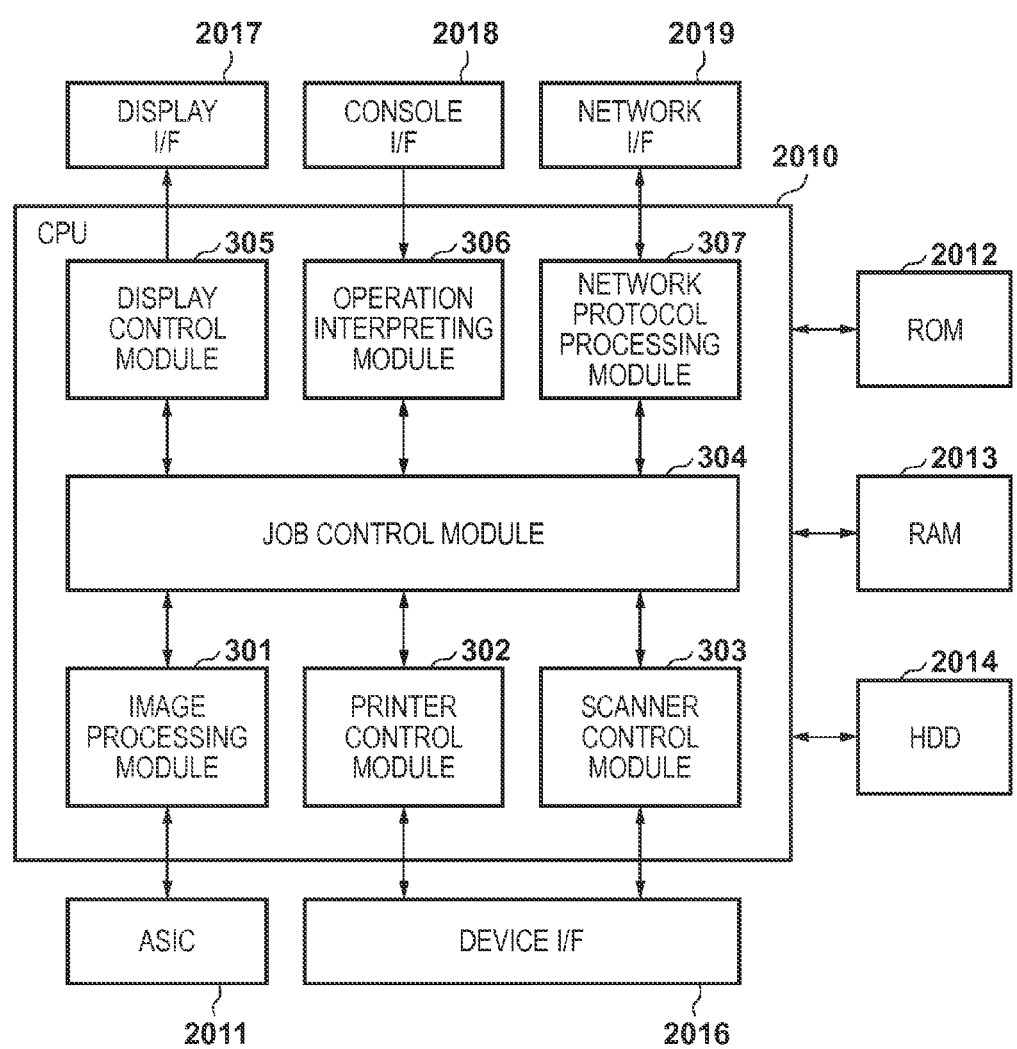
FIG. 3 is a block diagram for showing a configuration of a control program of the image forming apparatus according to the first embodiment.

FIG. 3 is a block diagram for showing a configuration of control programs of the image forming apparatus 1000 according to the first embodiment. Note that in FIG. 3, the same reference numerals are indicated for parts common to FIG. 2.

Control programs that are built into the image forming apparatus 1000 according to the first embodiment are stored in the ROM 2012 or the HDD 2014, and when a program is executed, the program is deployed into the RAM 2013 and executed under the control of the CPU 2010. For control programs, an image processing module 301, a printer control module 302, a scanner control module 303, a job control module 304, a display control module 305, an operation interpreting module 306, and a network protocol processing module 307 are provided.

The display control module 305 receives information such as a job and a state of the device from the job control module 304, and transmits a command to the display I/F 2017 to cause the information to be reflected in a display screen, and displayed on the display unit 320. The operation interpreting module 306 receives an operation command that is input by a user on the console unit 330 via the console I/F 2018, and makes various instructions such as starting, interrupting, restarting, and ending a job to the job control module 304. The network protocol processing module 307 performs standard network protocol processing that includes TCP/IP (Transmission Control Protocol/Internet Protocol). In this way, data transmission and receiving is realized via the network I/F 2019. The image processing module 301 receives and processes image data of an original document that was read in at the scanner unit 100. Also, in the case that the received image data is PDL (page description language) data, the image processing module 301 generates image data by expanding the PDL data. Then, by controlling a timing and parameter settings for transmission/reception of data corresponding to the ASIC 2011, image processing such as decompression/compression and rotation of image data is performed. The printer control module 302 controls the printer unit 200 by exchanging print control commands such as a feeding instruction command with the printer unit 200 via the device I/F 2016, and causes image data to be printed on paper media. The scanner control module 303 controls the scanner unit 100 via the device I/F 2016 such that image data is generated by reading in an original document. The job control module 304 receives data from the console I/F 2018 or the network I/F 2019 as a job, and in accordance with the contents of the job, executes the job while presiding over the operations of each device. For example, in a copy job, in addition to realizing a copy operation by controlling the scanner control module 303, the image processing module 301 and the printer control module 302, the job control module 304 outputs a display instruction such as one for displaying an execution status of the job to the display control module 305.

FIGS. 4A and 4B and FIGS. 5A and 5B depict views for illustrating examples of operation screen displayed to the display unit 320 when the display unit 320 and the console unit 330 are realized as a touch display in the image forming apparatus according to the first embodiment.

FIGS. 4A and 4B show an example of setting screens for a copy job for using a copy function in the first embodiment, and FIG. 4A shows an example of a top screen for performing a setting of the copy job. The top screen shown in FIG. 4A comprises a set number of copies display area 400, a finishing button 410, and a double-printing button 420.

FIG. 4B shows an example of a screen that is displayed when a user presses the finishing button 410 on the screen of FIG. 4A. This screen comprises a sorting button 411 and a grouping button 412.

The sorting button 411 is a button for setting an output mode (sort output) for repeatedly generating sheet bundles in units of copies according to a specified number of copies, wherein a copy is comprised of a plurality of pages that were printed consecutively. The grouping button 412 is a button for setting an output mode (group output) in which, for each page, print processing that repeatedly prints the same page for the number of copies specified is executed sequentially. Once the CPU 2010 receives a start instruction for a copy job from a user, the copy job is executed in accordance with settings made via the screens shown in FIG. 4A and FIG. 4B.

FIGS. 5A and 5B depict views for illustrating examples of screens that display an execution status of jobs that are being executed.

FIG. 5A shows an example of a screen that displays execution statuses of a copy job or a print job. On this screen, a list of jobs that are currently being executed and related information and execution statuses of the jobs are displayed in a display area 500. Also, a job that is currently being executed and a status of the device are displayed on a display area 521. Furthermore, this screen comprises various buttons for operating a job that is currently being executed, and a user can cause the execution of a job that is displayed on the display area 500 to stop by selecting the job and pressing a stop button 510.

FIG. 5B shows an example of a screen that is displayed when a user presses the stop button 510 in a state where a job 520 is selected in the screen in FIG. 5A. Here, a case is shown where a stop operation is received for the job 520 that is selected in the display area 500. If the stop button 510 is pressed in a state where the target job 520 is selected in the display area 500, a stopping dialogue 511 is displayed. The stopping dialogue 511 is a screen for prompting the user to confirm execution of the stop operation, and is provided with a message that queries whether or not the job is to be stopped, and a check-box 512 that allows a stopping method to be selected. If the user presses a "YES" button 513 in a state in which the check-box 512 is checked, then a stop between copies can be instructed to stop printing at a separation of copies. On the other hand, if the "YES" button 513 is pressed in a state in which the check-box 512 is not checked, then an instant stop can be instructed to immediately stop printing.

In stop between copies processing performed when an instruction is received to stop between copies, the CPU 2010 performs the following control. For example, a job for printing a 3 page original document in the sort output mode for 4 copies is received. In other words, for this job, 1 copy is made from a sheet bundle which is made from 3 sheets of print paper on which pages 1 through 3 are printed sequentially, and 4 copies of these sheet bundles are generated. Assume that while this job is being performed, when, for example, printing has completed for the first copy, printing of the first page of the second copy is being executed, an instruction is received from the screen in FIG. 5B to perform stop between copies processing. In this case, printing continues to be executed for the second page and the third page of a second copy, and after the sheet bundle of a second copy has been generated, the job ends.

Figure 6:
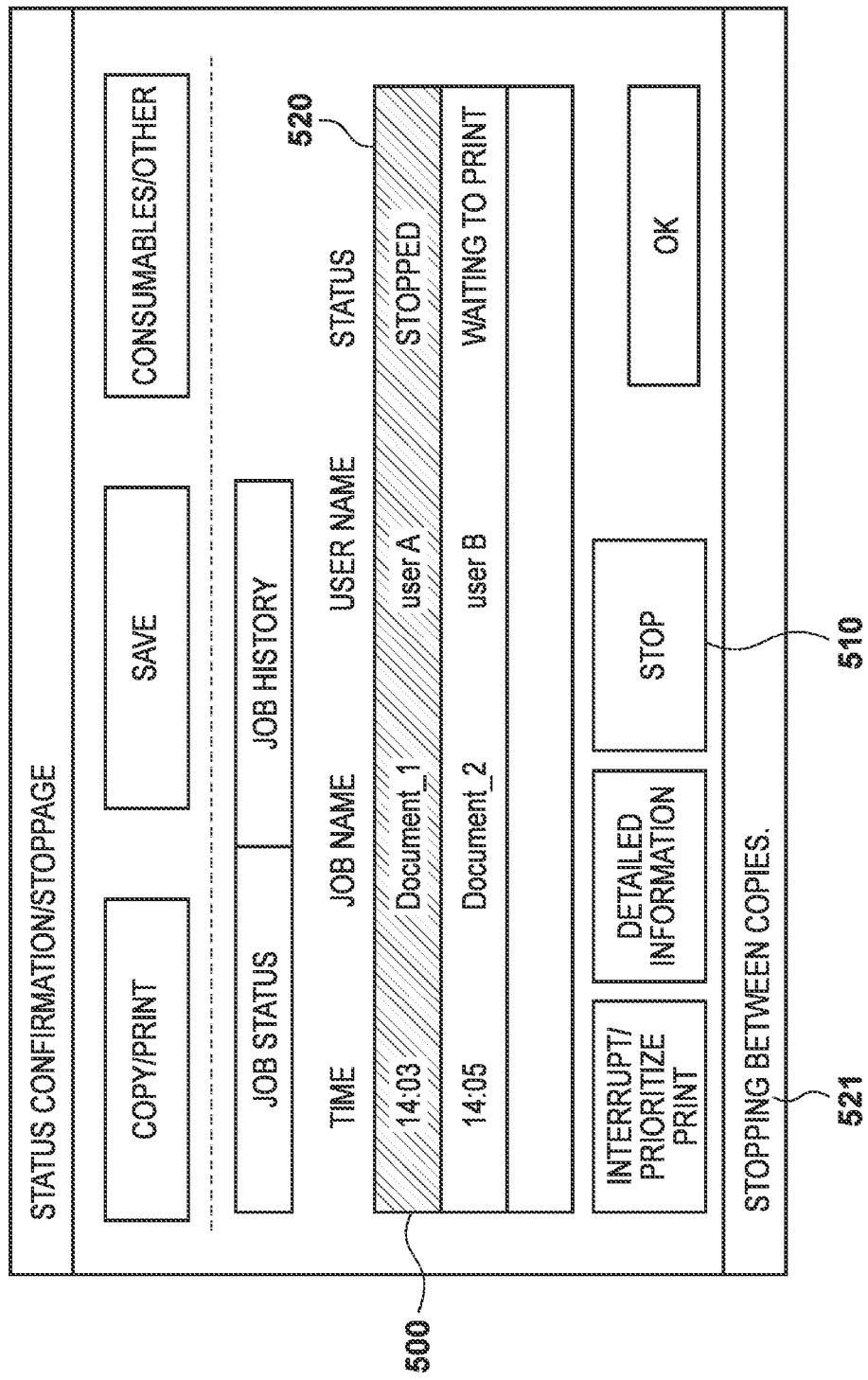
FIG. 6 depicts a view for illustrating an example of a screen that is displayed when stop between copies processing is being executed on the image forming apparatus according to the first embodiment.

FIG. 6 depicts a view for illustrating an example of a screen that is displayed when stop between copies processing is being executed by the image forming apparatus according to the first embodiment.

Once execution of stop between copies processing is started, the status of a job 520 that was selected on the display area 500 is changed to "stopped". Furthermore, the display area 521 displays "stopping between copies" to inform the user that stop between copies processing is being executed.

Meanwhile, an explanation will be given for a case in which stop between copies processing is performed on a job for printing a three page original document in four copies, for example, in the group output mode, i.e. on a job that generates a total of three sets (one for each page) of sheet bundles each comprising four print papers (one for each of the four copies) to which a corresponding page is printed repeatedly. In such a case, unlike the sort output mode job which generates a sheet bundle for each copy, there does not exist a clear separation (between copies) of copies in the group output mode job, and so printing is performed to the end even if the stop between copies is designated. In other words, the result of the execution of the job is the same as in a case in which the stopping processing is not executed.

Also, as another example, an explanation will be given for a case where an instant stop instruction is received when executing a job for printing a 3 page original document in the sort output mode in 4 copies. Here, assume that the printing of the first copy is already completed and the printing of the first page of the second copy is being executed. In this case, a configuration may be taken such that the printing of the first page of the second copy for which feeding and printing is already being performed is executed as is, and subsequent printing of the second page of the second copy for which printing is scheduled is not executed, and once printing of the first page of the second copy has completed, the job ends. At this time, a job may be similarly terminated in a case in which print operation is stopped due to an interruption caused by an error in the printing of the first page of the second copy during execution.

Next, explanation will be given for a case when an instant stop instruction is received while a job for printing in a group output mode is in progress. For example, assume that a job for printing a 3 page original document in the group output mode for 4 copies is received. Assume that for this job, as instruction for instant stop processing is received from the screen of FIG. 5B in the middle of print processing for to printing the first sheet of the second page being executed, where the 4 sheets (for the 4 copies) have already been printed for the first page. In the instant stop processing, printing of the first sheet of the second page for which feeding and printing is already being performed continues to be executed as is, printing of the second sheet of the second page which is scheduled to be printed next is not executed, and the job is terminated. Note that, in the case that the printing of the second page stops due to an error interruption during execution, the job may be terminated at that point in time.

Figure 7:
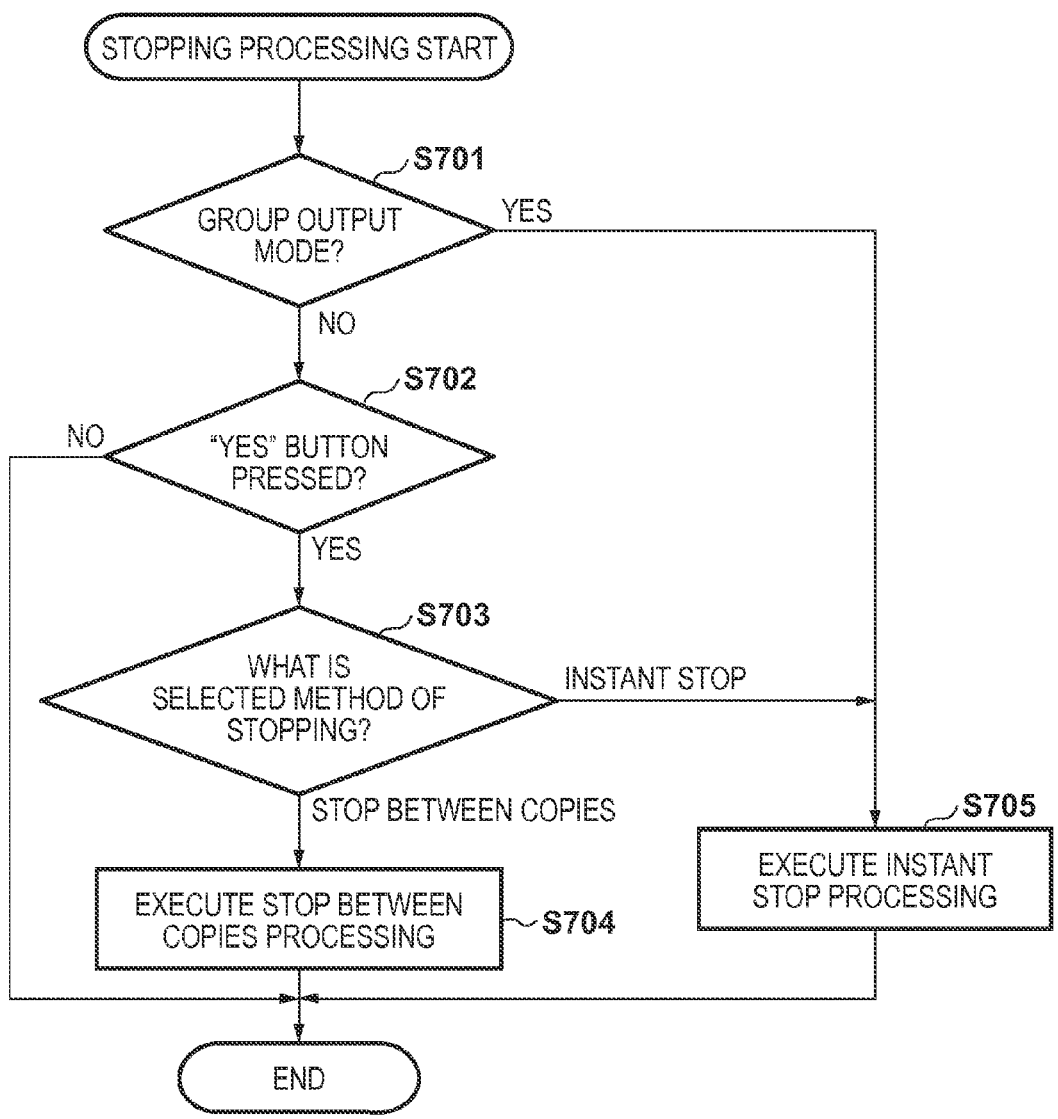
FIG. 7 is a flowchart for describing control when an instruction is made to stop printing on the image forming apparatus according to the first embodiment.

FIG. 7 is a flowchart for describing control when an instruction is made to stop printing on the image forming apparatus according to the first embodiment. This processing is realized by the CPU 2010 executing a control program that is deployed into the RAM 2013 from a ROM 2012 or the HDD 2014. This processing is started when the CPU 2010 receives a stop instruction (the stop button 510 is pressed in FIG. 5) from a user through the console I/F 2018 from the console unit 330.

First, in step S701, the CPU 2010 determines an output mode for the job 520 that is the target of stopping which was selected on the screen of FIG. 5B, and determines whether or not a group output mode is set for the job. In the case that a group output mode is set, the processing proceeds to step S705, the CPU 2010 executes instant stop processing for the job, and the processing completes.

On the other hand, in step S701, if it is determined that a group output mode is not set for the job, the processing proceeds to step S702, and the CPU 2010 displays a screen that includes the stopping dialogue 511 as shown in FIG. 5B. Then, it is determined whether or not the "YES" button 513 was pressed on this screen. If the "YES" button 513 was pressed, the processing proceeds to step S703, and the CPU 2010 determines the method of stopping for the stop instruction that was received. Here, if it is determined that the check-box 512 was not checked and an instant stop instruction was received, the processing proceeds to step S705, and the CPU 2010 executes the instant stop processing for the job.

On the other hand, if in step S703 the CPU 2010 determines that the check-box 512 in the screen of FIG. 5B is checked and a stop between copies instruction is received, the processing proceeds to step S704, the CPU 2010 executes the stop between copies processing for the job, and the processing completes.

Also, in step S702 in the case that it is determined that a "NO" button 514 is pressed instead of the "YES" button 513, the process is terminated without performing the stopping processing. The "NO" button 514 is pressed when a user wishes to cancel the stopping processing.

Also, for a job before printing is started, in both the case where a stop between copies instruction is received and the case where an instant stop instruction is received, instant stop processing is executed. At this time, the CPU 2010 does not execute printing of the first page of the job, and the job is completed.

Also, in the case that a part of a job that is referred to as a trial print and a proof print is executed, when a stop between copies instruction is received, the CPU 2010 may execute instant stop processing rather than the stop between copies processing.

Also, in the case that a print operation is stopped due to an error such as a jam, or the like, that occurs for a job for which stop between copies processing is being performed, execution of the job may be terminated at that point in time without printing up until the separation of copies is completed. In other words, instant stop processing may be executed instead of stop between copies processing.

Also, a configuration may be taken such that an instant stop instruction can be received for a job for which stop between copies processing is being performed. In this case, when the CPU 2010 receives the instant stop instruction, processing switches from the stop between copies processing to the instant stop processing, which is then executed.

By the first embodiment, as explained above, if an instruction is made to stop execution of a job for which a group output mode, which is for printing the same page repeatedly for a specified number of copies is performed, is specified, job execution is immediately stopped. Because of this, the generation of unnecessary printed materials can be reduced.

Second Embodiment

Next, a second embodiment of the present invention is explained. In the second embodiment, if an instruction is performed to stop execution of a job for which the group output mode is specified, a screen that the user is allowed to confirm the instant stoppage of the job is displayed. An explanation will be given for an example in which the instant stop of a job is only performed when the user gives consent. Note that, since the hardware configuration of the image forming apparatus according to the second embodiment is the same as that of the image forming apparatus 1000 according to the previously described first embodiment, explanation will be omitted.

Figure 8:
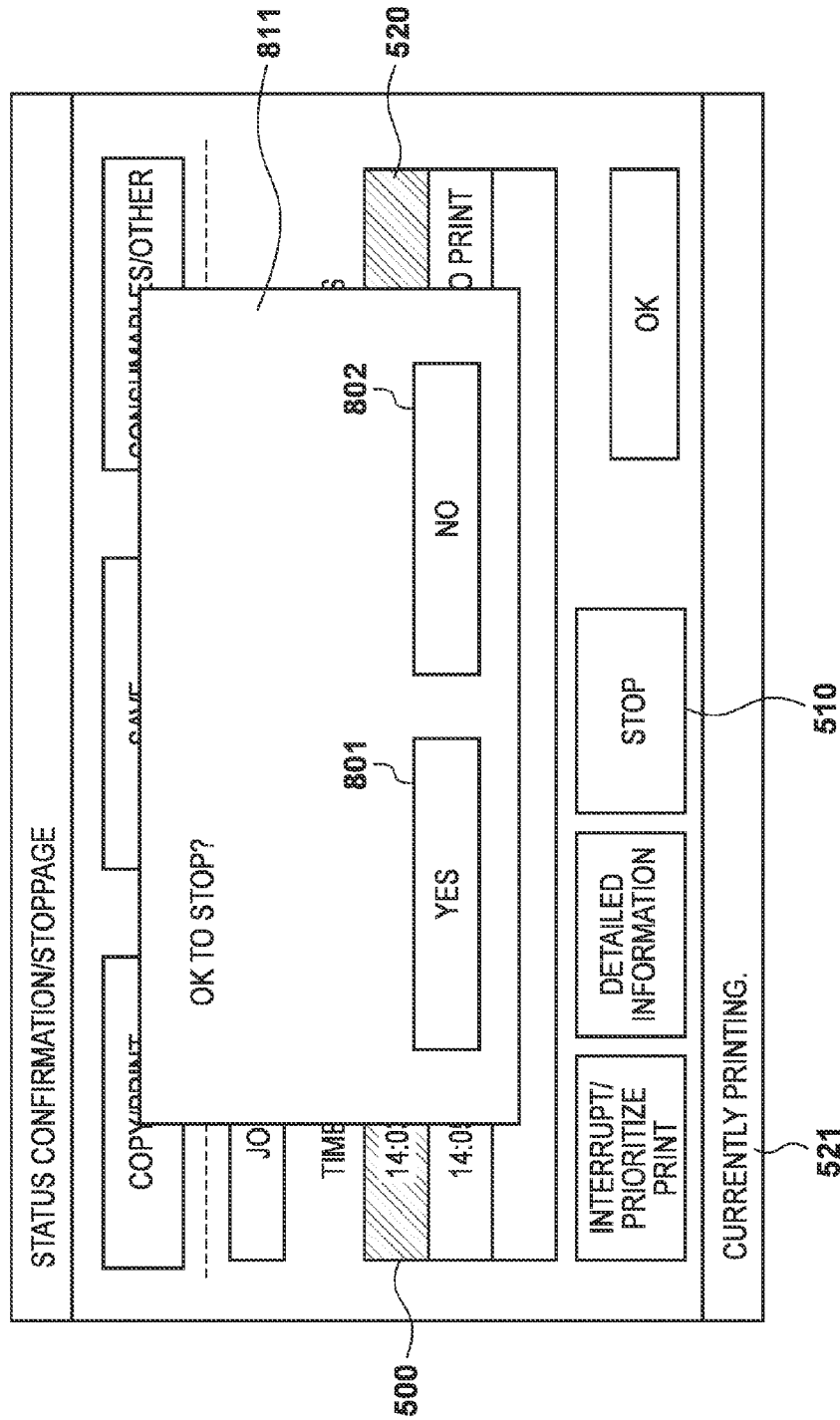
FIG. 8 depicts a view for illustrating an example of a screen that is displayed to the display unit when a user presses a stop button on the image forming apparatus according to the second embodiment.

FIG. 8 depicts a view displayed in the image forming apparatus 1000 according to the second embodiment, and for illustrating an example of a screen that is displayed on the display unit 320 when a user presses the stop button 510 in FIG. 5A. Note that in FIG. 8, the same reference numerals are indicated for parts common to previously described FIGS. 5A and 5B.

In the second embodiment, a stopping dialogue 811 is displayed when the stop button 510 is pressed, in a state where the job 520, for which the group output mode of the display area 500 is set, is selected. The stopping dialogue 811 is arranged with a message to query whether or not to stop a job, a "YES" button 801 for authorizing the stopping of the execution of the job 520, and a "NO" button 802 for not authorizing the stopping of the execution of the job 520. If the "YES" button 801 is pressed by a user, execution of the job 520 is immediately stopped; however if the "NO" button 802 is pressed, execution of the job 520 is not stopped, and the execution of the job 520 is continued.

On the other hand, if the stop button 510 is pressed in a state where the job 520, for which the group output mode of the display area 500 is not set, is selected, the stopping dialogue 511 as shown in the previously described FIG. 5B is displayed. In such a case, as previously explained the user can select either to immediately stop execution of a job, or stop at a separation of copies.

Figure 9:
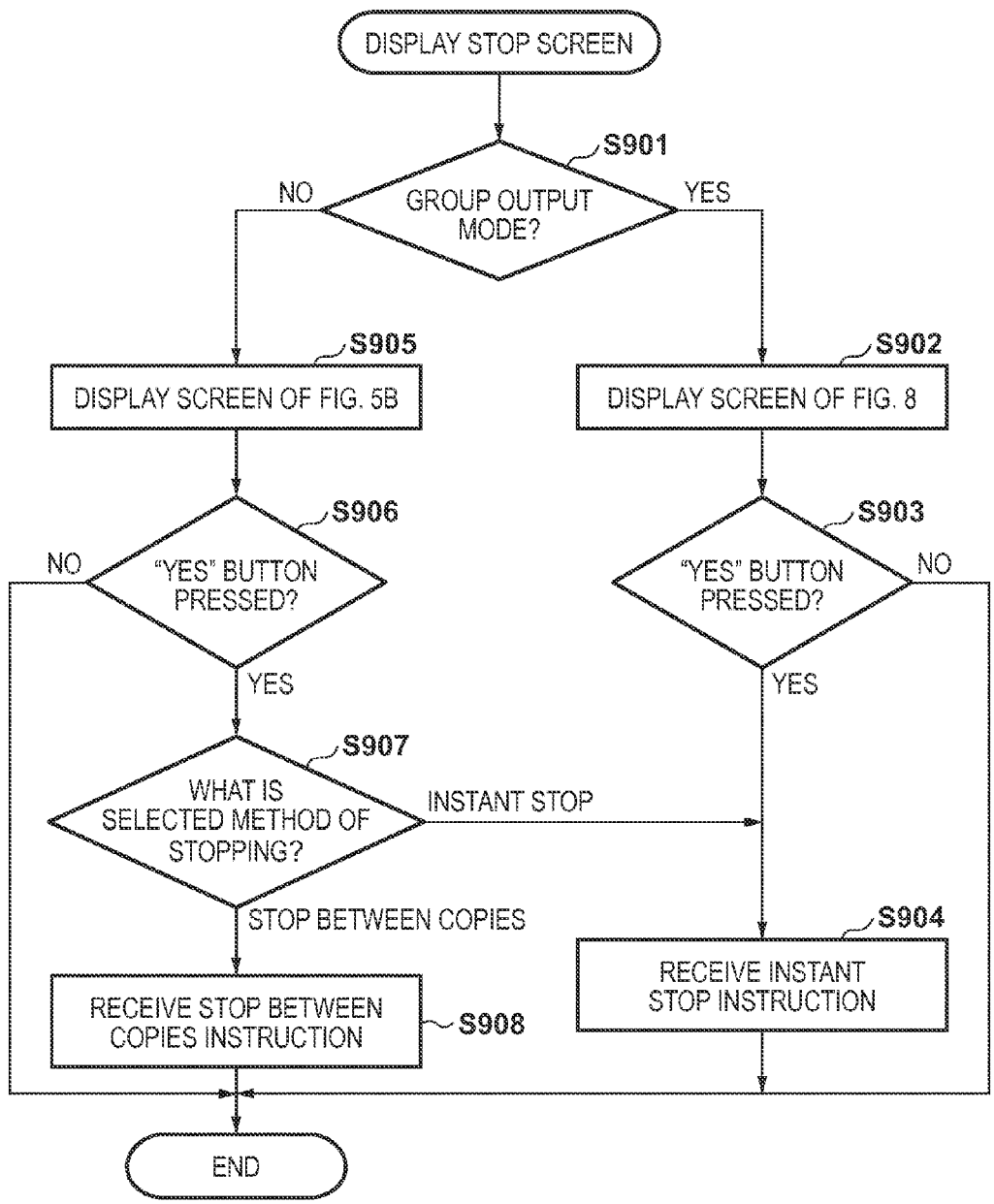
FIG. 9 is a flowchart for describing control when an instruction is made to stop printing on the image forming apparatus according to the second embodiment.

FIG. 9 is a flowchart for describing a control when an instruction is made to stop printing on the image forming apparatus 1000 according to the second embodiment. This processing is realized by the CPU 2010 executing a control program that is deployed into the RAM 2013 from the ROM 2012 or the HDD 2014.

First, in step S901 the CPU 2010 determines the output mode that was set for the selected job in the display area 500. In step S901, once it is determined that a group output mode is set for the job, the processing proceeds to step S902 and the CPU 2010 displays the stopping dialogue 811 in which the stopping method shown in FIG. 8 is unselectable. Then the processing proceeds to step S903 and the CPU 2010 determines whether or not the "YES" button 801 is pressed in the stopping dialogue 811 of FIG. 8; when the "YES" button 801 is pressed the processing proceeds to step S904, an instant stop instruction is received, and the processing completes. On the other hand, when the "YES" button 801 is not pressed in step S903, i.e., if the "NO" button 802 is pressed, a stop instruction is not received, and the processing completes. Note that configuration may be taken such that at this time, in the case where a plurality of jobs are selected in the display area 500, the stopping dialogue 811 is only displayed when group output mode is set for all jobs that are selected.

On the other hand, in step S901 if the CPU 2010 determines that the group output mode is not set for the selected job, the processing proceeds to step S905, and the CPU 2010 displays the stopping dialogue 511 in which the stopping method is selectable, as shown in FIG. 5B, for example. Next, the processing proceeds to step S906, and the CPU 2010 determines whether or not the "YES" button 513 was pressed at this screen. If the "YES" button 513 is pressed, the processing proceeds to step S907, and the CPU 2010 determines the stopping method of the stop instruction received by the check-box 512. In a case where the CPU 2010 determines, in step S907, that the stop between copies is selected, the processing proceeds to step S908, the CPU 2010 receives a stop between copies instruction, and the processing completes. Also, when the CPU 2010, in step S907, determines that the instant stop is selected, the processing proceeds to step S904, an instant stop instruction is received, and the processing completes. Note that the instant stop processing and the stop between copies processing performed by the CPU 2010 after receiving a stop instruction are respectively the same as the processing shown in step S704 and step S705 in FIG. 7.

By the second embodiment, as explained above, if an instruction is performed to stop execution of a job for which the group output mode is specified, a user is allowed to confirm that the instant stopping of the job be performed, and only when the user gives consent, the instant stop is performed for job. Because of this, an occurrence of a situation where a user does not intend for an instant stop to be performed on a job, and the instant stop of a job is performed against the intent of the user due to the group output mode being specified can be prevented.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-083999, filed Apr. 15, 2014, which is hereby incorporated by reference herein in its entirety.

What is claimed is:

1. A printing control apparatus capable of executing a print job, using a print unit, for printing each of a plurality of pages for a designated number designated by a user, the apparatus, comprising: a controller, that includes at least one processor, configured to function as: a control unit configured to be able to execute a first type of print job for printing in a first print order that repeatedly prints each of the plurality of pages in units of copies of the designated number to generate sheets of the designated number of copies and be able to execute a second type of print job for printing in a second print order that repeatedly prints each of the plurality of pages for the designated number to generate sheets of each page for a number of pages of the plurality of pages; and a receiving unit configured to receive an instruction for stopping the print job in execution, wherein the control unit is configured to: determine whether the print job in execution is the first type of print job or the second type of job when the receiving unit receives the instruction for stopping the print job, perform a first control to stop the print job in execution after completion of printing of a final page of the plurality of pages included in a copy for which printing for the print job in executed, in accordance with having determined that the print job in execution is the first type of print job, and perform a second control to stop the print job in execution without starting printing of a next page of the plurality of pages after completion of printing of a page of the plurality of pages, in accordance with having determined that the print job in execution is the second type of print job.

2. The printing control apparatus according to claim 1, wherein the control unit stops printing without starting print process for a new sheet in a case where the instruction to stop the print job in execution does not include an instruction to stop the print job in execution at a separation of copies, even in a case where the instruction received before the starting of execution of the print job indicates the first type of print job.

3. The printing control apparatus according to claim 1, wherein the controller is configured to further function as: a provision unit configured to provide to a user an option for stopping the print job in execution after completion of print process of a final page of the plurality of pages included in a copy, in accordance with an instruction which is received before the starting of execution of the print job and which indicates the first type of print job, and not to provide to a user the option for stopping the print job in execution, in accordance with an instruction which is received before the starting of execution of the print job and which indicates the second type of print job, wherein the receiving unit receives an instruction for stopping the print job in execution after completion of print process of a final page of the plurality of pages included in a copy in a case that the option is selected by the user.

4. The printing control apparatus according to claim 3, wherein the provision unit provides the option in a check box format.

5. A printing control apparatus capable of executing a print job, using a print unit, for printing each of a plurality of pages the designated number of times, the apparatus
   a controller, that includes at least one processor, configured to function as:
   a first receiving unit configured to be able to receive a user's selection of a first print method for printing a copy including the plurality of pages the designated number of times, and to receive a user's selection of a second print method for printing, for each page of the plurality of pages, the page consecutively the designated number of times to print a next page;
   a control unit configured to start, after the receiving of the user's selection, to execute a print job of the plurality of pages, the print job being executed according to the user's selection of the first print method or the second print method;
   a second receiving unit configured to receive a user's instruction to stop the print job in execution,
   wherein the control unit is configured to:
   control the second receiving unit to enable receiving an instruction as to whether or not to stop the print job in execution at a separation of copies, in accordance with the user's selection of the first print method received before the starting of execution of the print job, and
   control the second receiving unit, to disable receiving the instruction as to whether or not to stop the print job in execute at a separation of copies, in accordance with the user's selection of the second print method received before the starting of execution of the print job.

6. The printing apparatus according to claim 5, wherein the control unit is configured to:
   cause a first screen for enabling the receiving of the instruction as to whether or not to stop the print job in execution at a separation of copies to be displayed in accordance with the user's selection of the first print method received before the starting of execution of the print job, and
   cause a second screen for disabling the receiving of the instruction as to whether or not to stop the print job in execution at a separation of copies to be displayed, in accordance with the user's selection of the second print method received before the starting of execution of the print job.

7. The printing apparatus according to claim 5, wherein, in accordance with the user's selection of the first print method received before the starting of execution of the print job, a user is able to instruct, via the second receiving unit, to stop the print job in execution at a separation of copies, or to stop the print job in execution without starting print process for a new sheet after completion of print process of a page of the plurality of pages, and in accordance with the user's selection of the second print method received before the starting of execution of the print job, a user is not able to instruct, via the second receiving unit, to stop the print job in execution at a separation of copies, but is able to stop the print job in execution without starting print process for a new sheet after completion of print process of a page of the plurality of pages.

8. The printing apparatus according to claim 7, wherein the control unit, performs a first control to stop the print job in execution after completion of print process of a final page included in a copy for which print process is started, in accordance with that the second receiving unit receives the instruction for stopping the print job in execution at a separation of copies, and perform a second control to stop the print job in execution without starting printing for a new sheet, in accordance with that the second receiving unit receives the instruction for stopping the print job in execution without starting print process for the new sheet.

9. A method of controlling a printing control apparatus capable of executing a print job, using a print unit, for printing each of a plurality of pages a designated number of times the method, comprising:

receiving a user's selection of a print method, wherein the user's selection of a first print method for printing a copy including the plurality of pages the designated number of times is allowed, and the user's selection of a second print method for printing, for each page of the plurality of pages, the page consecutively the designated number of times to print a next page is allowed;

starting, after the receiving of the user's selection, to execute a print job of the plurality of pages, the print job being executed according to the user's selection of the first print method or the second print method;

controlling to enable receiving an instruction as to whether or not to stop the print job in execution at a separation of copies, in accordance with the user's selection of the first print method received before the starting of execution of the print job; and controlling to disable receiving the instruction as to whether or not to stop the print job in execution at a separation of copies, in accordance with the user's selection of the second print method received before the starting of execution of the print job.

10. A printing control apparatus for printing each page of a plurality of pages a designated number of times on sheets, comprising:

a controller, that includes at least one processor, configured to function as:

a first receiving unit configured to be able to receive a user's selection of a first print method for printing a copy including the plurality of pages the designated number of times, and to receive a user's selection of a second print method for printing each page of the plurality of pages the designated number of times, consecutively;

a control unit configured to start, after the receiving of the user's selection, to execute a print job of the plurality of pages, the print job being executed according to the user's selection of the first print method or the second print method;

a second receiving unit configured to receive a user's instruction to stop the print job in execution, wherein the control unit is configured to, in a case where the user's instruction is received:

in accordance with the user's selection of the first print method received before the starting of execution of the print job, stop the print job in execution after completion of print process of a final page of the plurality of pages included in a copy for which print process is started, and in accordance with the user's selection of the second print method received before the starting of execution of the print job, stop the print job in execution without starting print process for a new sheet.

11. A printing control method for printing each page of a plurality of pages a designated number of times on sheets, comprising:

receiving a user's selection of a print method, wherein the user's selection of a first print method for printing a copy including the plurality of pages the designated number of times is allowed, and the user's selection of a second print method for printing each page of the plurality of pages the designated number of times, consecutively, is allowed;

starting, after the receiving of the user's selection, to execute a print job of the plurality of pages, the print job being executed according to the user's selection of the first print method or the second print method;

receiving a user's instruction to stop the print job in execution, in a case where the user's instruction is received, controlling the print job in execution to be stopped, wherein the controlling:

stops, in accordance with the user's selection of the first print method received before the starting of execution of the print job, the print job in execution after completion of print process of a final page of the plurality of pages included in a copy for which print process is started, and stops, in accordance with the user's selection of the second print method received before the starting of execution of the print job, the print job in execution without starting print process for a new sheet.

* * * * *